Nov. 12, 1957 R. L. DALTON 2,812,909
MODULATING AND CUT-OFF VALVE CONTROL APPARATUS
Filed April 12, 1956 3 Sheets-Sheet 1

INVENTOR.
ROBERT L. DALTON
BY
*Alan M. Stanley*
ATTORNEY

Nov. 12, 1957  R. L. DALTON  2,812,909
MODULATING AND CUT-OFF VALVE CONTROL APPARATUS
Filed April 12, 1956  3 Sheets-Sheet 2

INVENTOR.
ROBERT L. DALTON
BY
*Alan M. Staubly*
ATTORNEY

Nov. 12, 1957

R. L. DALTON 2,812,909

MODULATING AND CUT-OFF VALVE CONTROL APPARATUS

Filed April 12, 1956

INVENTOR.
ROBERT L. DALTON
BY
*Alan M. Staubly*
ATTORNEY

United States Patent Office 2,812,909
Patented Nov. 12, 1957

2,812,909

MODULATING AND CUT-OFF VALVE CONTROL APPARATUS

Robert L. Dalton, Minneapolis, Minn., assignor to Minneapolis-Honeywell Regulator Company, Minneapolis, Minn., a corporation of Delaware Application April 12, 1956, Serial No. 577,878

3 Claims. (Cl. 236—80)

This invention relates to improvements in modulating diaphragm valves that are swiftly closed upon the main valve reaching a minimum flow position, by causing the introduction of sufficient pressure fluid into the control pressure chamber of the diaphragm valve to thus cause such closure.

In the prior art, there are diaphragm valve arrangements wherein complete closure of the valve occurs when the valve attains a minimum flow position. One such arrangement concerns a diaphragm valve which incorporates a constant bleed from a pressure source into the controlled pressure chamber for causing the positioning of the diaphragm valve. In such an arrangement a pilot valve is modulated in an orifice of a fluid conduit leading from the control pressure chamber to thereby determine the extent of leakage from the control pressure chamber, which in turn determines the position of the diaphragm valve. At a minimum flow condition of the diaphragm valve, a switch is actuated causing a solenoid operated valve in the fluid conduit to close and thereby close the path of escape of the pressure fluid from the control pressure chamber past the modulating pilot valve, and thereby causing a buildup of pressure in the control pressure chamber and consequently the closing of the diaphragm valve. In many applications, however, a constant bleed arrangement is not desirable.

The present arrangement overcomes the constant bleed drawbacks in that the control pressure chamber of the diaphragm valve is connected to a three way pilot valve which periodically, depending upon the magnitude of the condition to which the pilot valve is responsive, introduces or exhausts pressure fluid to or from the control pressure chamber, which causes modulation of the diaphragm valve without the need of a constant bleed. Upon the diaphragm valve attaining a minimum flow open position, an adjustably positioned switch is actuated causing introduction of pressure fluid to the control pressure chamber and thereby causing the swift and complete closure of the diaphragm valve. The arrangement disclosed provides for an easy adjustment of the throttling range of the main valve. This throttling adjustment is included in a mechanism which actuates the pilot valve and provides "feedback" motion thereto. Thus, an arrangement is provided that allows modulation of a diaphragm valve from a full open position to a minimum flow open position without the utilization of a constant bleed arrangement and, upon attaining the minimum flow open position, the diaphragm valve is caused to swiftly close.

It is therefore an object of the invention to provide an improved non-bleed type of modulating diaphragm valve which can be modulated from a full open to a desired minimum flow open position, whereupon the diaphragm valve is caused to completely close, due to bellows actuation of a switch.

Another object of this invention is to provide a simple arrangement for the adjustment of the throttling range of a diaphragm valve having control apparatus including a pilot valve with a feedback mechanism.

Other objects of the invention will become apparent from a reading of the following specification and appended claims in which:

Figure 1:
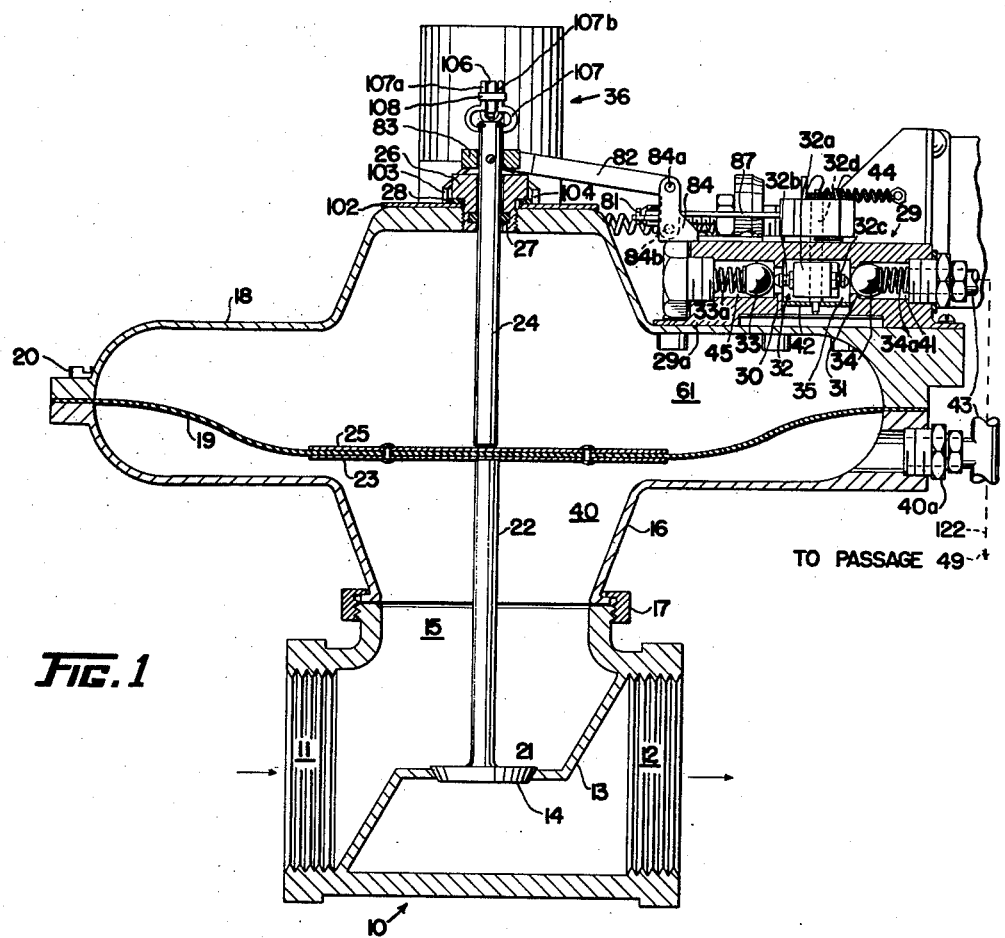
Figure 1 is a cross sectional view of the diaphragm valve.
Figure 2:
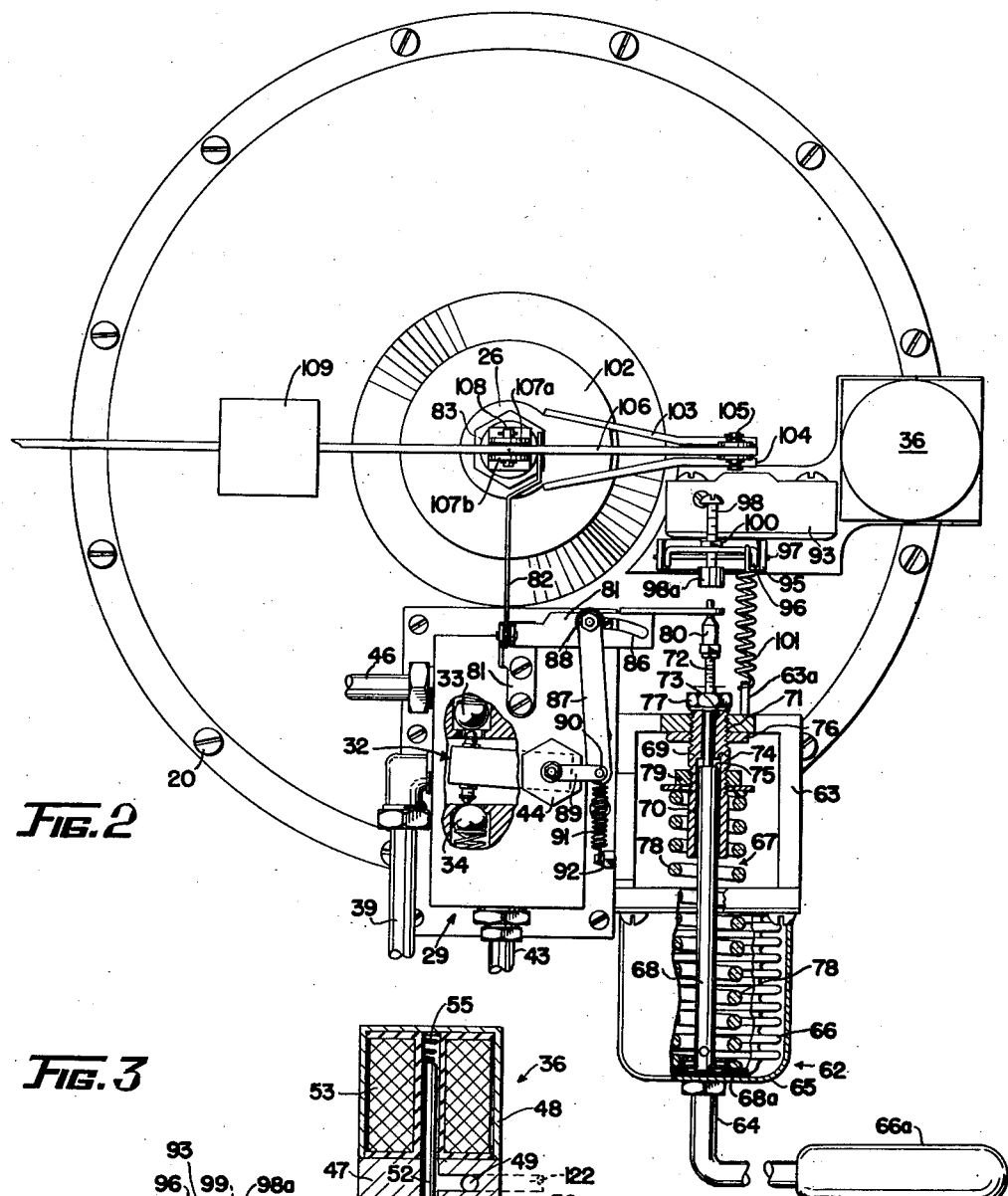
Figure 2 is a plan view of the diaphragm valve.
Figure 3:
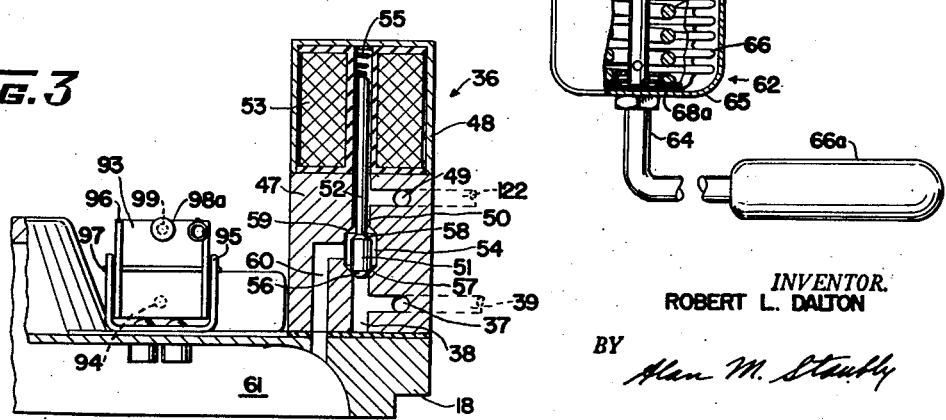
Figure 3 is a partial sectional view taken along the line 3—3 of Figure 2.

Referring to Figures 1, 2, and 3, valve body 10 has an inlet 11 connectable to a source of fluid pressure, such as gas pressure, and an outlet 12 which is connectable by a conduit, not shown, to a gas burner or other suitable apparatus, not shown, for utilizing such fluid. Interposed between the inlet 11 and the outlet 12 is an apertured wall 13 having a valve seat 14. The upper portion of the valve body 10 has an opening 15 over which is placed a lower housing section 16. A nut 17 provides a connection between the upper portion 15 of the valve body 10 and the lower housing section 16. Suitable sealing means is provided between the valve body 10 and the lower housing 16. An upper housing section 18 is located above the lower section 16 and a diaphragm 19 is interposed therebetween. Lower section 16 and upper section 18 are secured together by suitable fastening means, such as bolts 20, located in suitable holes provided in both housing sections. Main valve 21, which cooperates with the valve seat 14 to control gas flow has a valve stem 22 with a flange portion 23 at its other end. A flange portion 25 is suitably connected to the diaphragm 19 and to flange 23 by means of rivets. The upper portion of valve stem extension 24 passes through a guide plug 26 which is fastened to the upper housing 18. The guide contains suitable sealing means 27 and 28 to guard against the passage of fluid past the valve stem extension 24 or past the threads of guide plug 26.

A pilot valve 29 is suitably fastened to a portion of the upper section 18 and comprises a housing 29A containing valve seats 30 and 31, an actuating member 32 positioned in a chamber 35 between the valve seats, and ball valves 33 and 34 positioned on the other sides of the seats 31 and 32, respectively. The ball valves 33 and 34 are normally biased toward the valve seats 30 and 31, respectively, by springs 33A and 34A, respectively. It should be noted that when main valve 21 is in its closed position, ball valve 33 is off of its seat 30 due to the position of the actuating member 32. Chamber 35 is connected by conduit 39 and passage 37 to bore 38 of a solenoid valve 36. Chamber 40, located below the diaphragm 19 is fluidly connected to a chamber 41, containing valve 34 of the pilot valve 29, by means of a connection 40A and conduit 43. Chamber 45, containing valve 33 of the pilot valve 29 communicates with a bleed line 46 leading to a low pressure area or to the atmosphere. Actuating member 32 comprises a block 32A, adjustable actuating pins 32B and 32C located at opposite ends of the block 32A from each other, and a shaft 32D which passes through and is secured against relative rotation with respect to block 32A. The lower portion of shaft 32D, is guided in rib 42 which is suitably secured in housing 29A. Shaft 32D is located in block 32A such that rotation of shaft 32D causes rotational movement of actuating pins 32B and 32C about the axis of shaft 32D. Shaft 32D passes through housing 29A and a bearing plug 44 which is threaded into a suitable opening in housing 29A to thereby provide a guide for shaft 32D and a seal for chamber 35.

Solenoid valve 36 is located and suitably fastened to a portion of the upper section 18 and is comprised of a valve housing 47 and a coil housing 48, suitably attached to the valve housing 47. The valve housing 47 has provision, in the form of passage 49 and bore 50, for the introduction of pressure fluid to a valve chamber 54, between bore 50 and chamber 38, from a source upstream of the main valve 21 through a conduit 122. As mentioned above, the chamber 35 of the pilot valve 29 is in communication with passage 37 and chamber 38 via conduit 39. Stem 52 of a valve 51 is located in the tube of coil 53 and is biased downwardly by a spring 55 such that a lower valve surface 56 of the valve 51 rests on a valve seat 57 provided in the valve housing 47. A second valve surface 58 is provided on the valve 51 for engagement with a valve seat 59 when the valve stem 52 is drawn upwardly against the bias of the spring 55 upon energization of coil 53. A passage 60 connects valve chamber 54 of the valve housing 47 to a chamber 61 located above the diaphragm 19.

A bellows type actuator 62 is suitably attached to a support 63 which, in turn, is suitably fastened to a portion of the upper section 18. A conduit 64 is provided for connecting a source of fluid pressure representing the condition of a heating plant, such as boiler temperature responsive bulb 66A, to the bottom of a bellows housing 65 to cause movement of the lower free end of a bellows 66. The upper end of the bellows 66 is suitably attached to the upper end of bellows housing 65. An actuating stem 67 includes a lower portion 68 which extends from the bottom of the bellows 66 and passes through an opening in the upper end of bellows 66 and housing 65. The upper end of the portion 68 of actuating stem 67 is guided in opening 70 of a guide and adjustable stop member 69 which is threaded into opening 71 located in support 63. At its upper extremities actuating stem 67 has a portion 72 of smaller diameter to accommodate passage 73 located in the guide and adjustable stop member 69. The relative positions of shoulder 74 located in the guide and adjustable stop member 69 and shoulder 75 formed by portions 68 and 72 of actuating stem 67 determines the allowable travel of the actuating stem 67 under the compression of bellows 66. Nut 76 is provided to lock the guide and adjustable stop member 69 in place. Hex portion 77 of the guide and adjustable stop member 69 allows for easy adjustment of the member 69. A spring 78, the bias of which is determined by the position of nut 79 located on the guide and adjustable stop member 69, provides a counter force against the pressure force exerted on bellows 66 and this determines the initial pressure required to cause movement of actuating stem 67. Further, spring 78 engages disk 68A, which is suitably fastened to portion 68, thereby causing constant operative engagement between the bottom of bellows 66 and portion 68. To the portion 72 of the actuating stem 67, is attached an adjustable member 80 which engages a portion of a pilot valve actuating means and feedback mechanism.

The actuating means and feedback mechanism is essentially a teeter bar arrangement having a combination actuation-feedback member 81, one end of which is in abutting relationship with member 80 and is positioned by the condition responsive means 62 acting through the actuating stem 67 and the other end of which is pivotally connected to one end of the bell-crank lever 82 by means of a pivot pin 84B. The lever 82 is pivoted at its other end on a ring 83 which, in turn, is attached to the valve stem extension 24 by means of the pivot for lever 82. Member 82 rotates intermediate its ends about pin 84A which passes through suitable openings provided in member 82 and a support 84, which is suitably attached to the top surface of pilot valve housing 29A. Thus, it can be seen that movement of main valve 21 positions the other end of the actuation-feedback member 81. The actuation-feedback member 81 contains an arcuate slot 86 wherein one end of member 87 is pivoted and held in position by suitable fastening means 88. The arcuate slot is provided for easy adjustment of the position of this one end of member 87 to thereby control the throttling range of the main valve 21. The other end of member 87 is securely fastened to a crank arm 89 by pivot pin 90. This arm is non-rotatably attached to the pilot valve actuator shaft 32D, by suitable fastening means, such that movement of member 89 causes rotation of actuator shaft 32D about its axis. A spring 91, attached to a portion 92 of the bellows support 63 and to the pin 90 connecting the member 87 and the member 89, is provided to bias the actuation-feedback member against the adjustable member 80 of the actuating stem 67.

With an arrangement such as described above, assuming the pilot valve 29 to be in a neutral position, movement of the bellows actuating stem 67, due to a change in the magnitude of the condition acting on the bellows 66, causes a rotational movement of member 81 about the connection between member 81 and member 82, which connection remains stationary and thus acts as a pivot for member 81. This rotational movement of member 81 causes member 87 and member 89 to be repositioned to cause shaft 32D to rotate, thus causing the ball valve 33 or 34 of the pilot valve 29 to supply or exhaust pressure fluid to or from chamber 61 located above diaphragm 19, depending on the direction of rotation of member 81. Actuation of the pilot valve 29 results in movement of the main valve 21. As the main valve 21 is moved to a new position, valve stem extension 24 moves therewith causing a movement of member 82 and a consequent rotation of member 81 about the actuating stem 67 which is stationary and acts as a pivot for member 81. Again, member 87 and member 89 are repositioned, but this time to cause the pilot valve to assume its neutral position wherein both ball valves are closed. Thus, it can be seen that the arrangement described operates to both actuate the pilot valve 29 and to cause a feedback motion to be transmitted to said pilot valve to cause a neutral condition to be re-established.

A switch unit 93, having a normally open switch therein and an actuating plunger 94 extending therefrom, is located above and suitably attached to the upper surface of the upper section 18. A first channel-shaped bracket member 95 is also located above and attached to the upper surface of the upper section 18. A second channel shaped member 96 is located between the arms of the first member 95 and, by means of a pin 97 passing through both of the channel members, the second channel member 96 is capable of being rotated about pin 97. An adjustably positioned screw 98, having an enlarged portion 98A at one end, is received in a thread opening 99 located in the upper portion of the second channel member 96. A lock nut 100 is utilized to maintain the adjustably positioned screw 98 in place. A spring 101 is connected to an opening located in the upper portion of the second channel member 96 and arm 63A of the bellows support 63 to provide a continuous bias on the second channel member 96. Under normal conditions, the bias of the spring 101 provides a position of the second channel member 96 such that the normally open switch of the switch unit 93 is closed due to the force brought to bear on the contact 94 by the second channel member 96. At this point, it should be noted that the adjustably positioned screw 98 is so located that upon sufficient movement of the actuating stem 67 by compression of bellows 66, adjustable member 80 of the actuating stem 67 engages the enlarged portion 98A of the adjustably positioned screw 98, thereby causing rotational movement of the second channel member 96, against the bias of spring 101, away from plunger 94, thereby allowing the switch of the switch unit 93 to assume its normally open position.

A lever support 102, shown as being fabricated from sheet metal, is located on the uppermost portion of upper housing 18 and secured in place by the guide plug 26. Arms 103 and 104 of the lever support 102 contain suitable openings for provision of a pivot pin 105. A lever 106 is located between the arms 103 and 104 and contains an opening through which pivot pin 105 can pass to thus hold the right hand end of lever 106 in place. Lever 106 is straddled by arms 107A and 107B of a member 107 which is pivotally attached to valve stem extension 24 by means of pivot pin 108 which passes through the arms 107A and 107B and through lever 106 intermediate its ends, thus causing movement of lever 106 according to movement of valve stem extension 24 and thus valve 21. Counterweight 109 can be adjustably positioned along the length of the lever 106 to balance the weight of a damper, not shown, which is adapted to be actuated by the lever.

It should be here noted that should the damper, not shown, become locked in place thereby effectively locking the lever 106 in place. The main valve 21, if it is in an open position, may be moved to a closed or a less open position by the action of the pilot valve 29 or the solenoid valve 36 (as described below), as there is no direct connection between the main valve 21 and the lever 106. It will be observed that valve stem extension 24 which is effectively connected to lever 106 abuts, but is not joined to flange 25.

Figure 4:
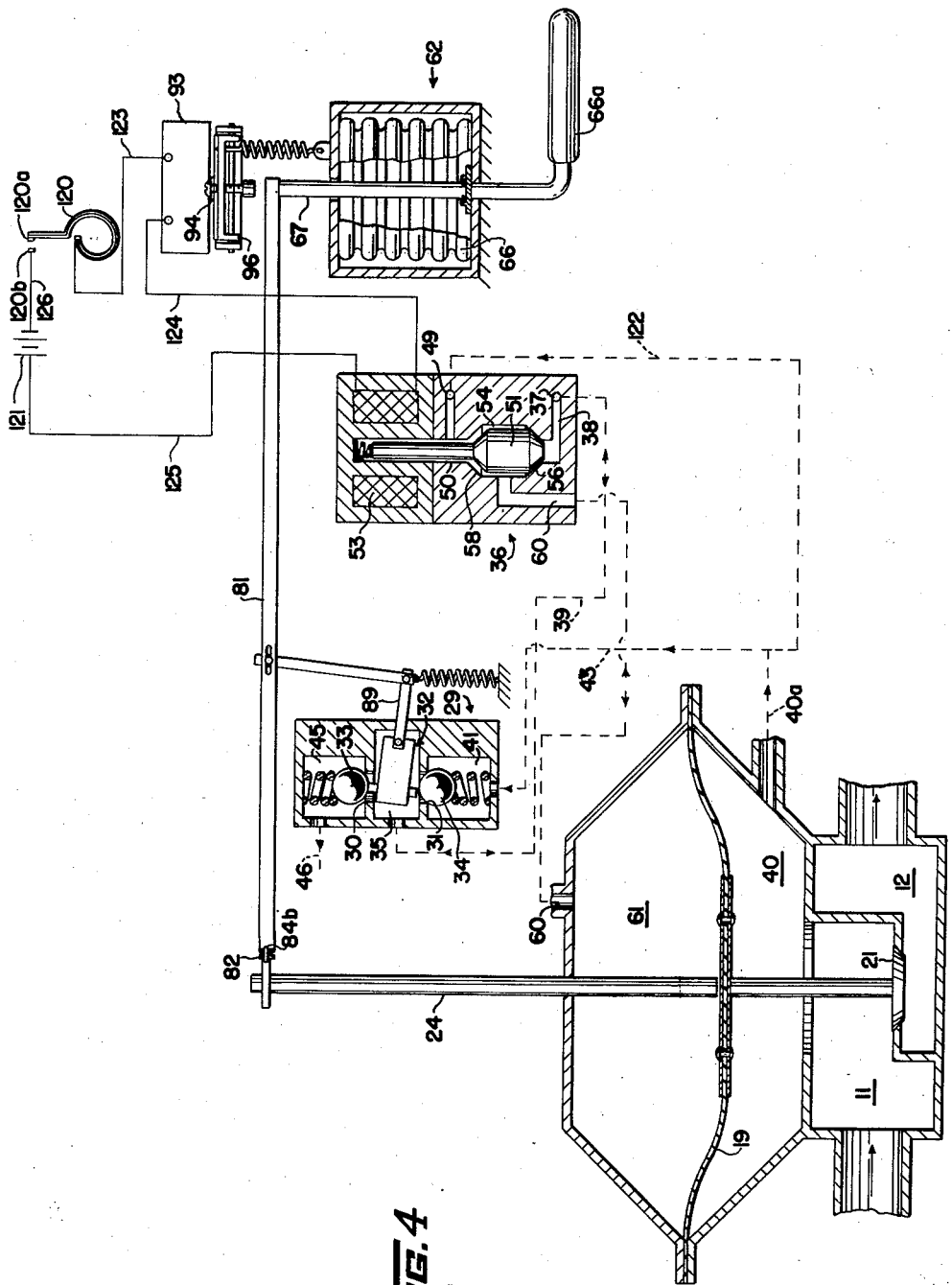
Figure 4 is a schematic showing of the diaphragm valve and its control system.

The operation of the valve control apparatus as shown in Figures 1, 2, and 3, will be more readily understood from a description of the operation of a gas burner control apparatus, including the valve control apparatus, schematically shown in Figure 4.

In Figure 4, the reference numbers used to identify the various elements will be the same as those used in Figures 1, 2, and 3. As some of the elements shown in Figure 4 are not shown in Figures 1, 2, or 3, these elements will now be described. A thermostat 120 having contacts 120A and 120B is placed in series relation with the switch unit 93, the coil 53 of the solenoid valve 36, and a source of voltage, such as a battery 121 by leads 123, 124, 125 and 126, in a conventional manner to provide automatic control means for the on-off operation of the valve in response to heating demand.

*Operation*

As viewed in the schematic showing of Figure 4, the main valve 21 is in a closed position, the magnitude of the condition acting on the bulb 66A, and hence the bellows 66, is at a minimum value and hence the switch of switch unit 93 is closed, contacts 120A and 120B of thermostat 120 are open and thus the series circuit is open and solenoid 36 is de-energized and in the positon shown, and the ball valve 33 of the pilot valve 29 is off its seat 30 and, therefore, open. This set of conditions allows for the unobstructed passage of pressure fluid from the main valve inlet 11 into the lower chamber 40, thence through connection 40A, conduit 122, passage 49, bore 50, chamber 54 and conduit 60 into the chamber 61 above the diaphragm 19, thereby insuring that the main valve 21 remains closed under this set of conditions.

Now, should the thermostat 120 make a demand for heat by the closing of contacts 120A and 120B, the series circuit, comprised of switch unit 93, battery 121, thermostat 120, contacts 120A and 120B, and solenoid valve 36 will be closed and thereby will cause the energization of the solenoid coil 53. The solenoid coil, upon being energized, causes the valve member 51 to rise, thereby opening valve 56 and closing valve 58. The opening of valve 56 allows for fluid communication between the chamber 61, passage 60, chamber 54, bore 38, passage 37, conduit 39, chamber 35, chamber 45 (the ball valve 33 being open), and the bleed line 46 leading to a gas burner, not shown, or some other suitable low pressure area. The effectual venting of the chamber 61 to atmospheric pressure, allows the pressure below the diaphragm 19 to move the diaphragm upwardly and thereby open the main valve 21. This upward movement of the diaphragm will continue until the limit of its movement is reached. The passage of gas past the main valve 21 goes to a suitable gas burner, not shown, where it is ignited and burned. The bulb 66A, and hence bellows 66, is responsive to a condition of a heating plant, not shown, wherein the gas is burned, such as furnace temperature, boiler temperature, boiler pressure, etc. As the burning in the heating plant continues, the bulb 66A begins to be affected and the bellows 66 contracts causing the actuator stem 67 to engage and rotate the member 81 of the actuation-feedback mechanism about the connection formed between members 81 and 82. This rotational movement of the member 81 causes a movement of members 87 and 89 and actuating member 32 to cause closure of ball valve 33, thereby closing off communication between chamber 61 and bleed line 46. If the movement of the bellows 66 is sufficient, an opening of the ball valve 31 of the pilot valve 29 will result which allows pressure fluid to pass from the pressure chamber 41 of the pilot valve 29 to the chamber 35 of the pilot valve 29, to conduit 39, passage 37, bore 38, past the valve 56 of the solenoid valve 36 into the chamber 54 and passage 60, and thence into the chamber 61 above the diaphragm 19 causing a downward movement of the diaphragm. The downward movement of the diaphragm causes a downward movement of the valve stem extension 24 resulting in a downward movement of the member 82, thereby causing a rotational movement of member 81. Member 81 rotates about the actuating stem 67 acting as a pivot thereby causing movement of member 87 and arm 89. The downward movement of valve stem extension 24 continues until the extent to which the ball valve 31 has been opened, due to the increase in magnitude of the condition effecting bellows 66, is alleviated by the closing motion given to the ball valve 31 by the feedback motion caused by the downward movement of diaphragm 19. Thus it can be seen that contraction of the bellows 66 causes a downward movement of the diaphragm 19 and for every position of the bellows there is a set determined position for the diaphragm and hence the main valve 21. This opening and closing of the ball valve 31 of the pilot valve 29 continues, as the condition to which the bellows is responsive increases in magnitude, until the main valve 21 reaches a minimum open position, at which time the bellows actuating stem 67 is about to cause the channel member 96 to move away from the plunger 94 of the switch unit 93. As the condition to which the bellows 66 is responsive increases a finite amount, the actuator stem 67 causes the channel member 96 to move away from the plunger 94 of switch unit 93 causing the switch to open, thereby opening the series circuit including the switch of the switch unit 93, the battery 121, thermostat 120, contacts 120A and 120B, and the solenoid valve 36. As the series circuit is broken, the solenoid coil 53 is de-energized and the valve member 51 is dropped and returned to the position shown in Figure 4, wherein valve 56 is closed and valve 58 is open. This allows pressure fluid to pass from the conduit 122, into passage 49 and bore 50, past valve 58 of the solenoid valve 36 into the valve chamber 54 and passage 60 and then into the chamber 61 above diaphragm 19 thereby causing a downward movement of the diaphragm and the main valve 21 until the main valve is in its closed position.

It should be noted, that closure of the main valve 21 results in a rotation of member 81, due to the movement of member 82 and the connection between member 81 and member 82, causing movement of member 87 and arm 89, and rotation of actuating member 32 to such an extent that ball valve 30 is caused to be lifted off its seat. This condition allows for recycling of the apparatus, as the path of escape for the fluid above the diaphragm 19 exists upon re-energization of solenoid valve 36 to thus allow upward movement of the diaphragm and main valve 21.

The main valve remains in a closed position until the magnitude of the condition, to which the bulb 66A, and hence the bellows 66 is responsive, is alleviated and the channel member 96 once again engages plunger 94 thereby closing the switch of the switch unit 93 and thereby the series circuit described above which causes solenoid coil 53 to be energized. Upon the solenoid coil 53 being energized, the main valve 21 can open to a position corresponding to the position of the actuator stem 67. It is apparent, of course, that should the thermostat 120 open its contacts 120A and 120B before the switch of switch unit 93 is opened, the series circuit would be broken and the solenoid coil 53 would be de-energized causing a closing of the main valve 21. Likewise, closing of the switch of the switch unit 93 by an alleviation of the condition to which the bulb 66A, and hence the bellows 66 is responsive will not cause opening of the main valve 21 if the thermostat 120 is satisfied.

While the above description of the operation of the apparatus was primarily concerned with gradually closing the main valve 21 after an initial opening, it is being recognized that the main valve can be modulated in either direction depending on whether the bellows 66 of the actuator 62 is caused to be expanded or contracted with respect to its previous position.

It is to be recognized that other modifications of the invention are possible without departing from the concepts disclosed. Therefore, the scope of the invention should be determined from the following claims.

I claim:

1. In a fluid flow control apparatus for a heating system, the combination comprising: a fluid flow valve; a housing associated with said fluid flow valve including a first and a second pressure chamber separated by a movable wall, the position of said fluid flow valve being dependent upon the position of said wall, said first chamber being constantly exposed to pressure fluid tending to open said fluid flow valve; a member associated with said wall and movable therewith; an electrically operated valve for introducing pressure fluid to or exhausting pressure fluid from said second chamber for moving said wall and thereby said fluid flow valve in an opening or closing direction depending on the condition of said electrically operated valve; a condition responsive switch and a limit switch placed in electrical series relation with said electrically operated valve so that when both of said switches are closed said electrically operated valve causes opening of said fluid flow valve and when one or both of said switches are open said electrically operated valve causes closing of said fluid flow valve; a three-way control valve including an actuating member and associated with said electrically operated valve for introducing pressure fluid to and exhausting pressure fluid from said second chamber to modulate the position of said wall and thus the position of said fluid flow valve between a full open position and a minimum open position; condition responsive means; and a combination actuating and feedback member operatively engaged near a first extremity thereof by said condition responsive means, operatively engaged near a second extremity thereof by the movable member associated with said wall, and operatively engaged between said extremities by the actuating member of said three-way valve, movement of said condition responsive means resulting in movement of said actuating and feedback member and actuation in a first direction of said three-way valve causing movement of said wall and the member associated therewith and said fluid flow valve and thereby resulting in movement of said actuating and feedback member and actuation in a second direction of said three-way valve; said three-way valve being operatively connected with said electrically operated valve in a manner so that when said electrically operated valve causes a closing of said fluid flow valve pressure fluid communication between said three-way valve and the pressure chamber with which it is connected is interrupted; said limit switch being opened by said condition responsive means upon said condition responsive means attaining a condition corresponding to a minimum open position of said fluid flow valve thereby resulting in closure of said fluid flow valve, said fluid flow valve being incapable of being reopened until the magnitude of the condition to which the condition responsive means is exposed has been abated and the limit switch resumes its closed condition.

2. In a fluid flow control apparatus for a heating system, the combination comprising: a fluid flow valve; a housing associated with said fluid flow valve including a first and a second pressure chamber separated by a movable wall, the position of said fluid flow valve being dependent upon the position of said wall, said first chamber being constantly exposed to pressure fluid tending to open said fluid flow valve; a member associated with said wall and movable therewith; an electrically operated valve for introducing pressure fluid to or exhausting pressure fluid from said second chamber for moving said wall and thereby said fluid flow valve in an opening or closing direction depending on the condition of said electrically operated valve; a condition responsive switch and a limit switch placed in electrical series relation with said electrically operated valve so that when both of said switches are closed said electrically operated valve causes opening of said fluid flow valve and when one or both of said switches are open said electrically operated valve causes closing of said fluid flow valve; a three-way control valve including an actuating member and associated with said electrically operated valve for introducing pressure fluid to and exhausting pressure fluid from said second chamber to modulate the position of said wall and thus the position of said fluid flow valve between a full open position and a minimum open position; condition responsive means; and a combination actuating and feedback member a first portion thereof operatively engaged by said condition responsive means, a second portion thereof operatively engaged by the movable member associated with said wall, and a third portion thereof operatively engaged by the actuating member of said three-way valve, movement of said condition responsive means resulting in movement of said actuating and feedback member and actuation in a first direction of said three-way valve causing movement of said wall and the member associated therewith and said fluid flow valve and thereby resulting in movement of said actuating and feedback member and actuation in a second direction of said three-way valve; means associated with said actuating and feedback member, said condition responsive means, the movable member associated with said wall, and the actuating member of said three-way valve for varying the relative distances between the points at which said condition responsive means, the movable member associated with said wall, and the actuating member of said three-way valve engage the actuating and feedback member to thereby provide for regulation of the throttling range of said fluid flow valve; said three-way valve being operatively connected with said electrically operated valve in a manner so that when said electrically operated valve causes a closing of said fluid flow valve pressure fluid communication between said three-way valve and the pressure chamber with which it is connected is interrupted; said limit switch being opened by said condition responsive means upon said condition responsive means attaining a condition corresponding to a minimum open position of said fluid flow valve thereby resulting in closure of said fluid flow valve, said fluid flow valve being incapable of being reopened until the magnitude of the condition to which the condition responsive means is exposed has been abated and the limit switch resumes its closed condition.

3. In a fluid flow control apparatus for a heating system, the combination comprising: a fluid flow valve; a housing associated with said fluid flow valve including a first and a second pressure chamber separated by a movable wall, the position of said fluid flow valve being dependent upon the position of said wall, said first chamber being constantly exposed to pressure fluid tending to open said fluid flow valve; a member associated with said wall and movable therewith; an electrically operated valve for introducing pressure fluid to or exhausting pressure fluid from said second chamber for moving said wall and thereby said fluid flow valve in an opening or closing direction depending on the condition of said electrically operated valve; a condition responsive switch and a limit switch placed in electrical series relation with said electrically operated valve so that when both of said switches are closed said electrically operated valve causes opening of said fluid flow valve and when one or both of said switches are open said electrically operated valve causes closing of said fluid flow valve; a three-way control valve including an actuating member and associated with said electrically operated valve for introducing pressure fluid to and exhausting pressure fluid from said second chamber to modulate the position of said wall and thus the position of said fluid flow valve between a full open position and a minimum open position; condition responsive means; and a combination actuating and feedback member, including an arcuate opening, a first portion of said actuating and feedback member operatively engaged by said condition responsive means and a second portion of said actuating and feedback member operatively engaged by the movable member associated with said wall, the actuating member of said three-way valve being operatively connected to said actuating and feedback member through said arcuate opening, the relative position of the operative connection between said actuating and feedback member and the actuating member of said three-way valve being determinative of the throttling range of said fluid flow valve, movement of said condition responsive means resulting in movement of said actuating and feedback member and actuation in a first direction of said three-way valve causing movement of said wall and the member associated therewith and said fluid flow valve and thereby resulting in movement of said actuating and feedback member and actuation in a second direction of said three-way valve; said three-way valve being operatively connected with said electrically operated valve in a manner so that when said electrically operated valve causes a closing of said fluid flow valve, pressure fluid communication between said three-way valve and the pressure chamber with which it is connected is interrupted; said limit switch being opened by said condition responsive means upon said condition responsive means attaining a condition corresponding to a minimum open position of said fluid flow valve thereby resulting in closure of said fluid flow valve, said fluid flow valve being incapable of being reopened until the magnitude of the condition to which the condition responsive means is exposed has been abated and the limit switch resumes its closed condition.

References Cited in the file of this patent

UNITED STATES PATENTS

| | | |
|---|---|---|
| 2,214,558 | Kronmiller | Sept. 10, 1940 |
| 2,317,640 | Ray | Apr. 27, 1943 |